(12) United States Patent
Spadola

(10) Patent No.: US 10,701,890 B2
(45) Date of Patent: Jul. 7, 2020

(54) ODOR FILTER APPARATUS

(71) Applicant: Joseph J. Spadola, Ridgefield, NJ (US)

(72) Inventor: Joseph J. Spadola, Ridgefield, NJ (US)

(*) Notice: Subject to any disclaimer, the term of this patent is extended or adjusted under 35 U.S.C. 154(b) by 113 days.

(21) Appl. No.: 15/611,148

(22) Filed: Jun. 1, 2017

(65) Prior Publication Data
US 2017/0347618 A1    Dec. 7, 2017

Related U.S. Application Data

(60) Provisional application No. 62/345,228, filed on Jun. 3, 2016.

(51) Int. Cl.
*A01K 1/01* (2006.01)
*A01K 1/00* (2006.01)

(52) U.S. Cl.
CPC .......... *A01K 1/0052* (2013.01); *A01K 1/0107* (2013.01)

(58) Field of Classification Search
USPC ................ 119/418, 500, 419, 493, 161–173; D30/161
See application file for complete search history.

(56) References Cited

U.S. PATENT DOCUMENTS

| | | | |
|---|---|---|---|
| 5,044,325 A | 9/1991 | Miksitz | |
| 5,140,948 A | 8/1992 | Roberts | |
| D331,649 S * | 12/1992 | Saja | ............................. D30/120 |
| 5,315,964 A * | 5/1994 | Mimms | ................. A01K 1/0107 119/165 |
| 5,511,513 A * | 4/1996 | Baron | .................. A01K 1/0107 119/163 |
| 5,564,364 A * | 10/1996 | Kovacs | ................. A01K 1/0107 119/163 |
| 5,655,478 A * | 8/1997 | Kiera | .................... A01K 1/0107 119/165 |
| 5,778,822 A * | 7/1998 | Giffin | .................... A01K 1/0047 119/165 |
| 5,988,108 A | 11/1999 | Silver | |
| 6,079,364 A | 6/2000 | Tamba | |
| 6,123,048 A | 9/2000 | Alkire | |
| 6,176,201 B1 * | 1/2001 | Fields | .................. A01K 1/0107 119/163 |
| 6,341,579 B1 | 1/2002 | Alkire | |
| 8,485,131 B2 * | 7/2013 | Veness | ................. A01K 1/0107 119/165 |

(Continued)

FOREIGN PATENT DOCUMENTS

WO    WO98/01374    1/1998

*Primary Examiner* — Andrea M Valenti
(74) *Attorney, Agent, or Firm* — Michael A. Blake

(57) ABSTRACT

An odor filter apparatus for a litter box comprising: a rear wall; a first side wall located on one side of the rear wall, and orientated orthogonally to the rear wall; a second side wall located on an opposite side of the rear wall from the first side wall, and orientated orthogonally to the rear wall, the walls configured to rigidly attach to a litter box bottom, a vent located in the rear wall; a filter housing attached to the rear wall, on a side opposite the first and second side walls; an active odor removing element located in the filter housing; a fan assembly housing removeably attached to the filter housing; a blower fan located in the fan assembly housing; a mounting opening in the fan assembly housing; a fan exhaust sealing device attached to the mounting opening.

5 Claims, 16 Drawing Sheets

(56) References Cited

U.S. PATENT DOCUMENTS

| | | | |
|---|---|---|---|
| 8,881,680 B1* | 11/2014 | Woody | A01K 1/0114 |
| | | | 119/165 |
| 9,565,830 B1* | 2/2017 | Caico | A01K 1/0114 |
| 2004/0094097 A1* | 5/2004 | Shartell | A01K 1/0107 |
| | | | 119/165 |
| 2005/0028254 A1 | 2/2005 | Whiting | |
| 2006/0156993 A1* | 7/2006 | Wright | A01K 1/0107 |
| | | | 119/165 |
| 2007/0215057 A1* | 9/2007 | Geer | A01K 1/0047 |
| | | | 119/165 |
| 2010/0132624 A1* | 6/2010 | Ferrer | A01K 1/0047 |
| | | | 119/500 |
| 2010/0180830 A1 | 7/2010 | Fritter | |
| 2011/0048330 A1 | 3/2011 | Mathews | |
| 2011/0197464 A1* | 8/2011 | Chappell | F26B 9/003 |
| | | | 34/202 |
| 2014/0141708 A1* | 5/2014 | Baker | F04D 19/002 |
| | | | 454/249 |

* cited by examiner

LARGE ARROWS INDICATE DIRECTION OF AIR MOVEMENT

ODOR FILTER APPARATUS

CROSS-REFERENCES

This patent application claims the benefit of U.S. Provisional Patent Application No. 62/345,228 by inventor Joseph J. Spadola entitled "CAT LITTER ODOR FILTER," filed on Jun. 3, 2016, and which provisional application is fully incorporated by reference herein.

TECHNICAL FIELD

The present invention relates in general to an odor filter apparatus, and in particular to an improved apparatus for filtering odors from air associated with a pet litter container.

BACKGROUND

Many people keep domestic pets, particularly cats in a house or an apartment. When the pet does not have free access to a suitable outdoor location for elimination, a litter container or litter box is typically provided in an interior room of the house or apartment. As every cat owner has surely experienced, such a litter container can become offensively odoriferous. In the prior art, many means for moving or removing pungent odors from such pet litter boxes have been disclosed. For example, several litter box ventilation systems use fans and flexible hoses to carry odorous air completely outside the house. Disadvantages of this type of system include the requirement that the litter container be located near an opening to the outside of the house and the manipulation of a clumsy flexible hose which may limit the portability of the pet litter container. Litter box ventilators that exhaust to the outside of the house must also prevent other animals, insects, rodents, and/or inclement weather from entering the house through the outdoor exhaust opening. In other vented litter boxes, expensive and complex switch and timer systems are used to turn on the exhaust fan so that the pet feels comfortable enough in the litter box to actually use the litter box. Other prior art litter box ventilators draw air through the litter material in order to keep odor from emanating from the litter material. Problems with drawing air through the litter material include keeping the ventilation system clean, and the a particularly harsh environment for the motor used to move the odoriferous air. With regard to filters in litter boxes, prior art odor removing filters have not been self-contained, or have not provided an easy way to change the filter material when it is dirty or no longer able to remove odors.

Therefore, there is a need for an apparatus that overcomes the above described and other disadvantages.

SUMMARY OF THE INVENTION

The invention relates to an odor filter apparatus for a litter box, the odor filter apparatus comprising: a vent base, with a top side and a bottom side; an inlet opening in the vent base; a plurality of channels in the bottom side of the vent base, configured to direct air flow to the inlet opening; a filter housing attached to the top side of the vent base; an active odor removing element located in the filter housing; a fan assembly housing removeably attached to the filter housing; a blower fan located in the fan assembly housing; a mounting opening in the fan assembly opening; a fan exhaust sealing device attached to the mounting opening; four soft button feet attached to the bottom side of the vent base; wherein the blower fan is configured to pull air through the inlet opening, through the active odor removing element, and out through the fan exhaust sealing device.

The invention also relates to an odor filter apparatus for a litter box, the odor filter apparatus comprising: a litter box bottom; a litter box top configured to sit on the litter box bottom; a vent in the litter box top; a filter housing attached to the litter box top; an active odor removing element located in the filter housing; a fan assembly housing removeably attached to the filter housing; a blower fan located in the fan assembly housing; a mounting opening in the fan assembly opening; a fan exhaust sealing device attached to the mounting opening; wherein the blower fan is configured to pull air through the vent, through the active odor removing element, and out through the fan exhaust sealing device.

In addition, the invention relates to an odor filter apparatus for a litter box, the odor filter apparatus comprising: a rear wall, the rear wall configured to rigidly attach to a litter box bottom; a first side wall located on one side of the rear wall, and orientated orthogonally to the rear wall, the first side wall configured to rigidly attach to a litter box bottom; a second side wall located on an opposite side of the rear wall from the first side wall, and orientated orthogonally to the rear wall the first side wall configured to rigidly attach to a litter box bottom; a vent located in the rear wall; a filter housing attached to the rear wall, on a side opposite the first and second side walls; an active odor removing element located in the filter housing; a fan assembly housing removeably attached to the filter housing; a blower fan located in the fan assembly housing; a mounting opening in the fan assembly opening; a fan exhaust sealing device attached to the mounting opening; wherein the blower fan is configured to pull air through the vent, through the active odor removing element, and out through the fan exhaust sealing device.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
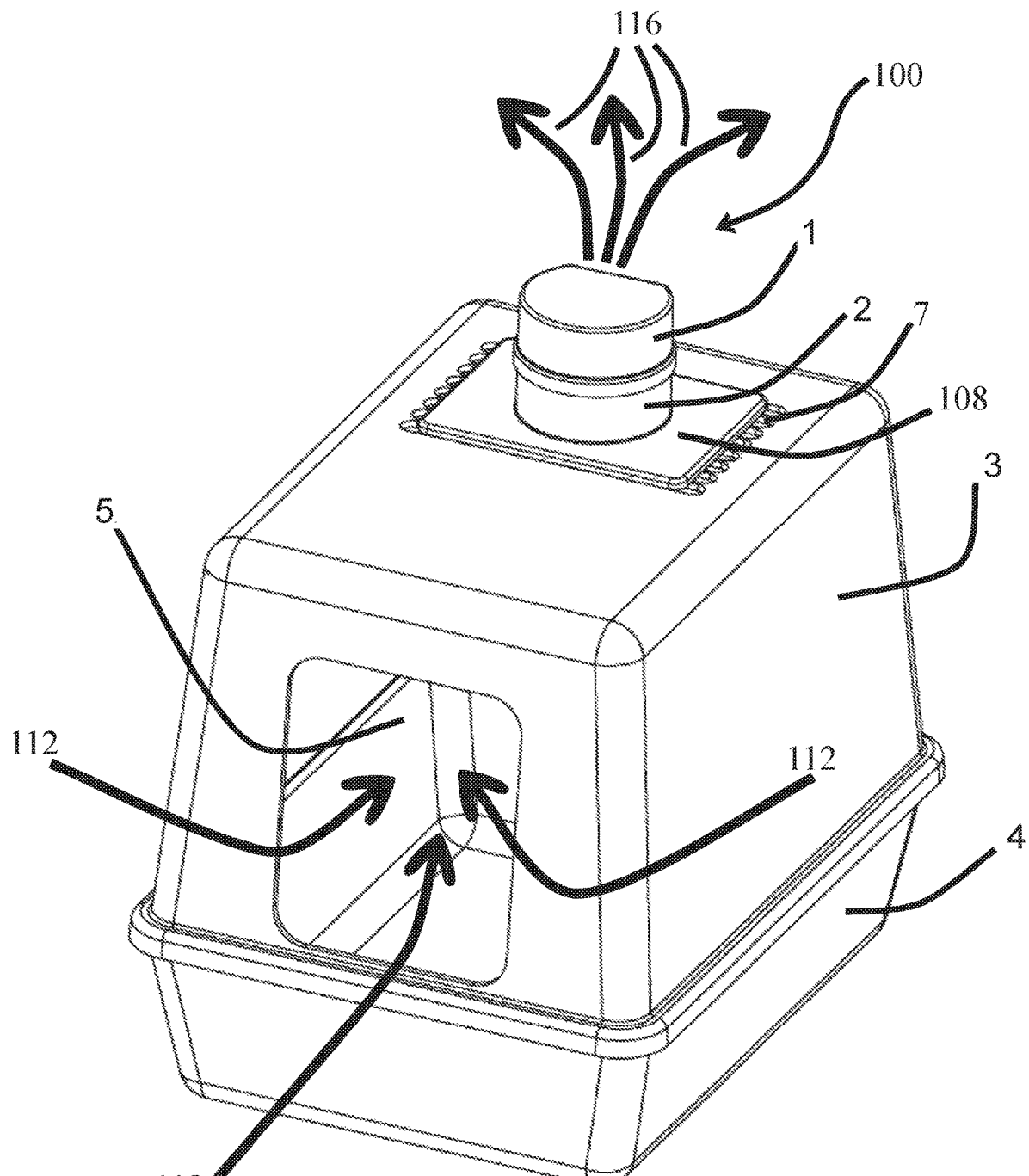
FIG. 1 is a perspective view of a first embodiment of the odor filter apparatus.

FIG. 1 shows a front perspective view of the odor filter apparatus 100 installed on a litter box top 3, which in turn in is installed on a litter box bottom 4. The invention comprises the fan assembly housing 1, removeably attached to a filter housing 2. The litter box top 3 may have a top vent 7. The invention 100 may comprise a vent base 108, configured to hold the fan assembly housing 1 and filter housing 2 while the vent base 108 sits on the vent 7. Arrows 112 show the air path into the litter box top 3, and arrows 116 show the air path exiting the fan assembly housing 1. The litter box top 3 has an entrance 5.

Figure 2:
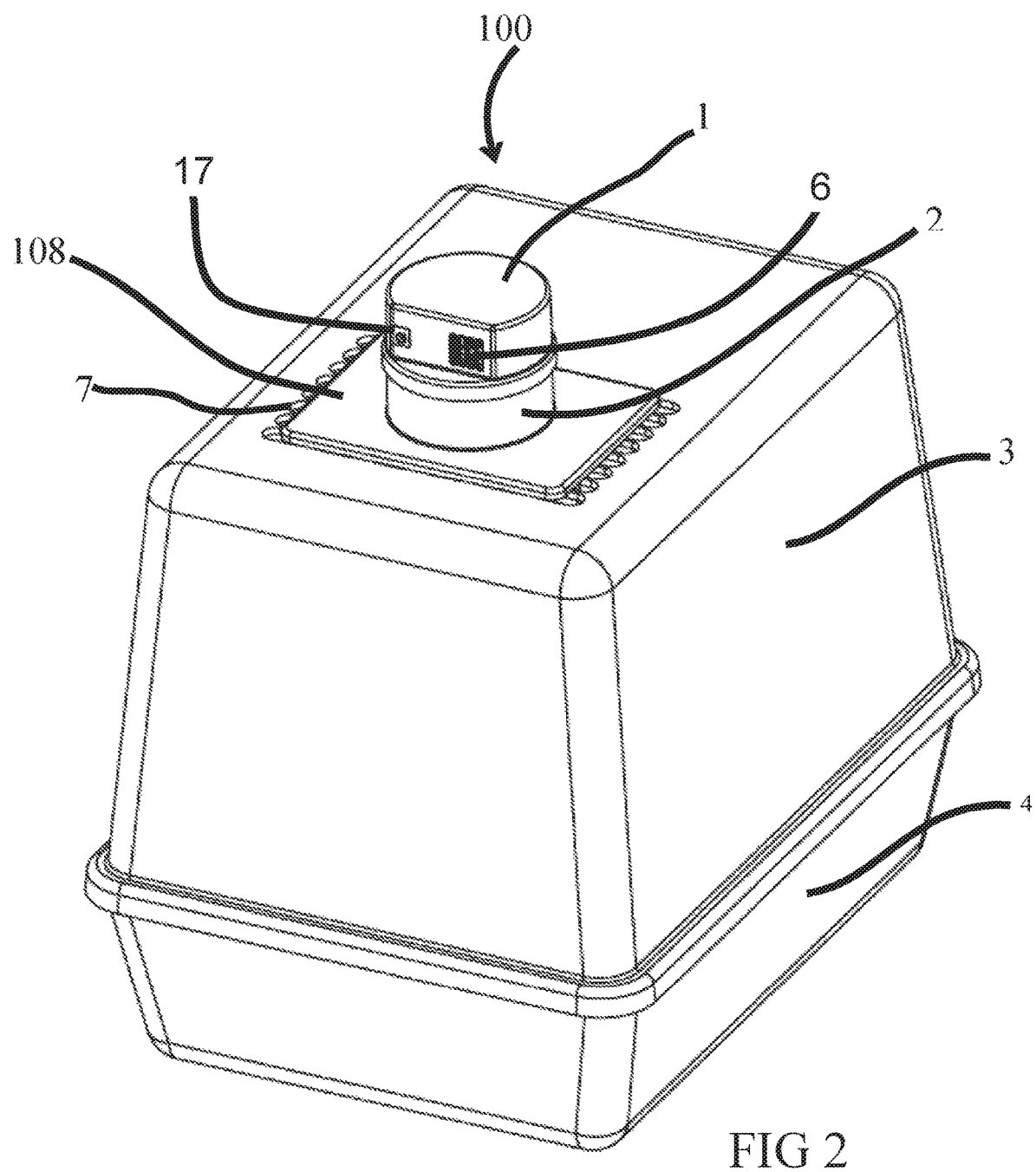
FIG. 2 is a rear perspective view of the odor filter apparatus from FIG. 1.

FIG. 2 shows a rear perspective view of the invention 100. In this view, the outlet port 6 on the fan assembly housing 1 is visible. Also visible is a power supply adaptor 17. The power supply and cord are not shown for simplicity.

Figure 3:
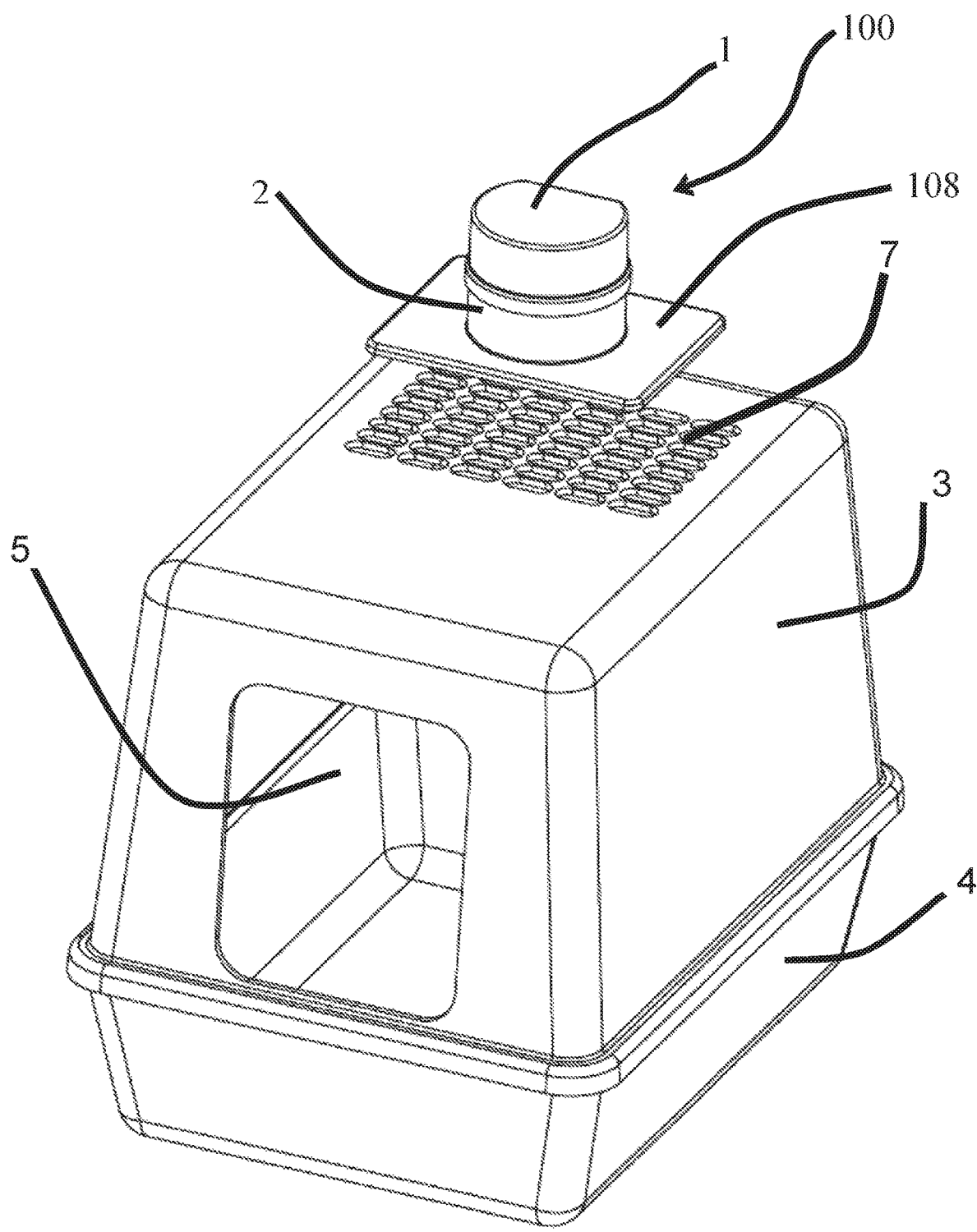
FIG. 3 is a front perspective view of the odor filter apparatus from FIG. 1, with the odor filter apparatus lifted above the litter box top.

FIG. 3 shows a front perspective view of the invention 100 lifted up off the litter box top 3 thereby giving an unobstructed view of the vent 7.

Figure 4:
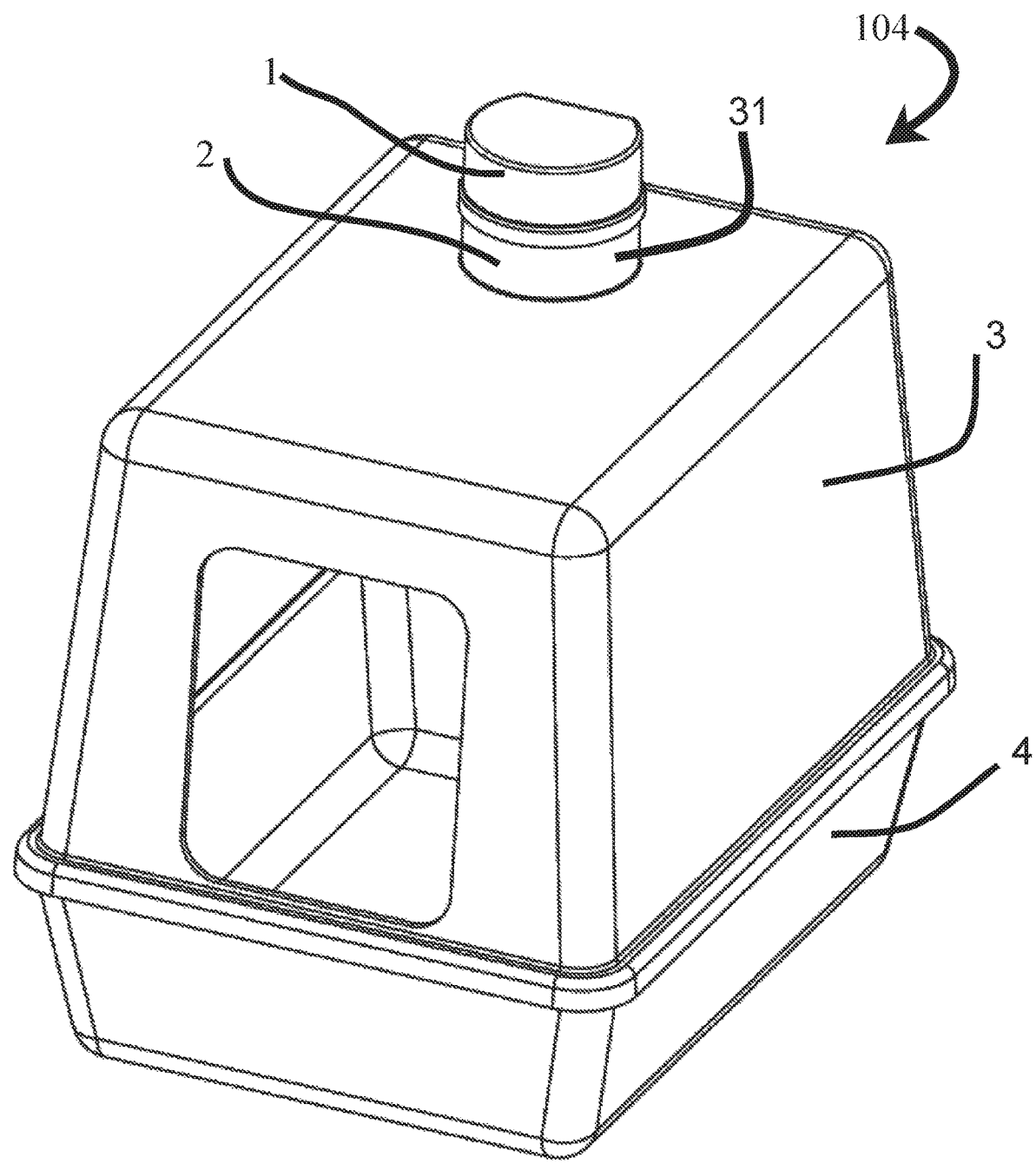
FIG. 4 is a front perspective view of a second embodiment of the odor filter apparatus.

FIG. 4 shows another embodiment of the invention 104. In this embodiment, the filter housing 2 may be manufactured as integral piece 31 with the litter box top 3. In still another embodiment, the invention 104 may be retrofitted onto a litter box top 3 by cutting circular hole into the top of the litter box top 3, and attaching the filter housing 2 to the litter box top 3.

Figure 5:
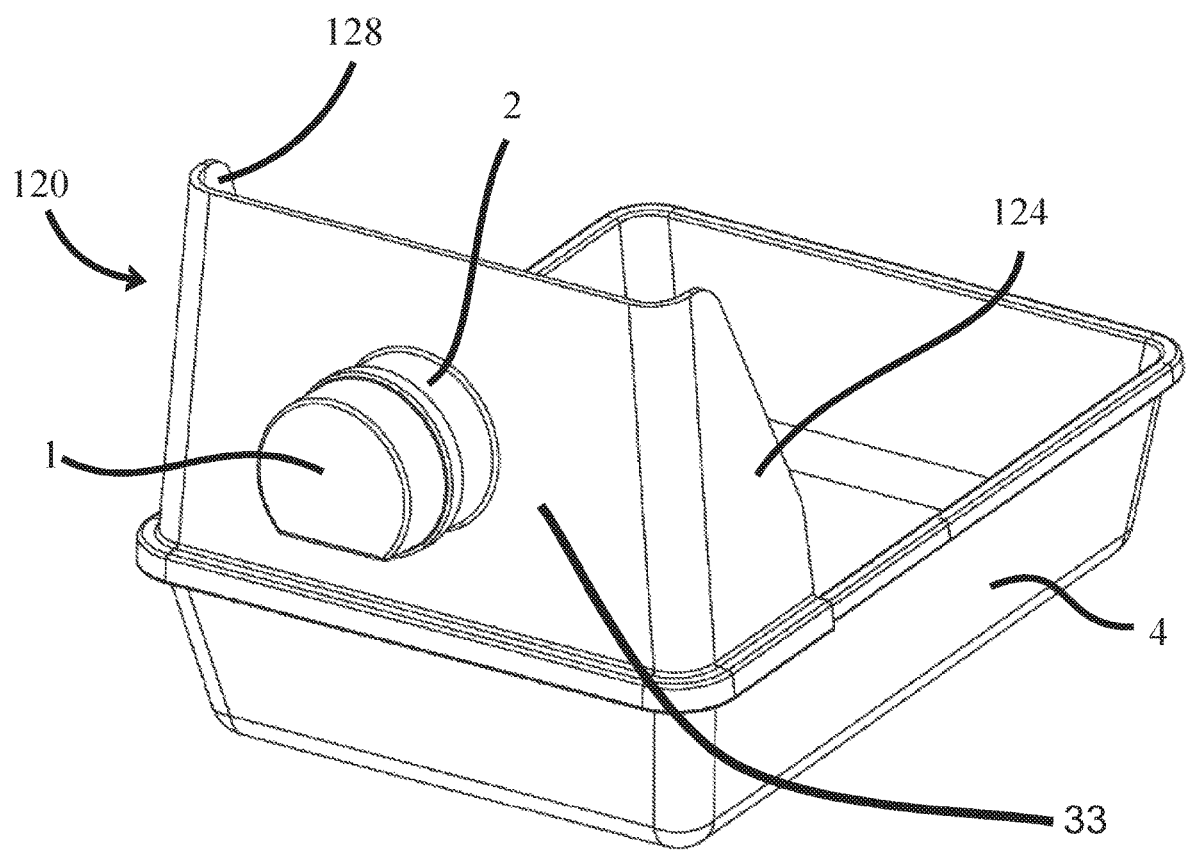
FIG. 5 is a rear perspective view of a third embodiment of the odor filter apparatus.

FIG. 5 shows a rear perspective view of another embodiment of the invention 120. In this embodiment, the cat litter box bottom 4 does not have a corresponding top 3. In this case, the filter housing 2 may be molded into a rear wall 33. The rear wall 33 may also comprise side walls 124, 128 which provide for stability. The rear wall 33 may be attachable to a litter box bottom 4.

Figure 6:
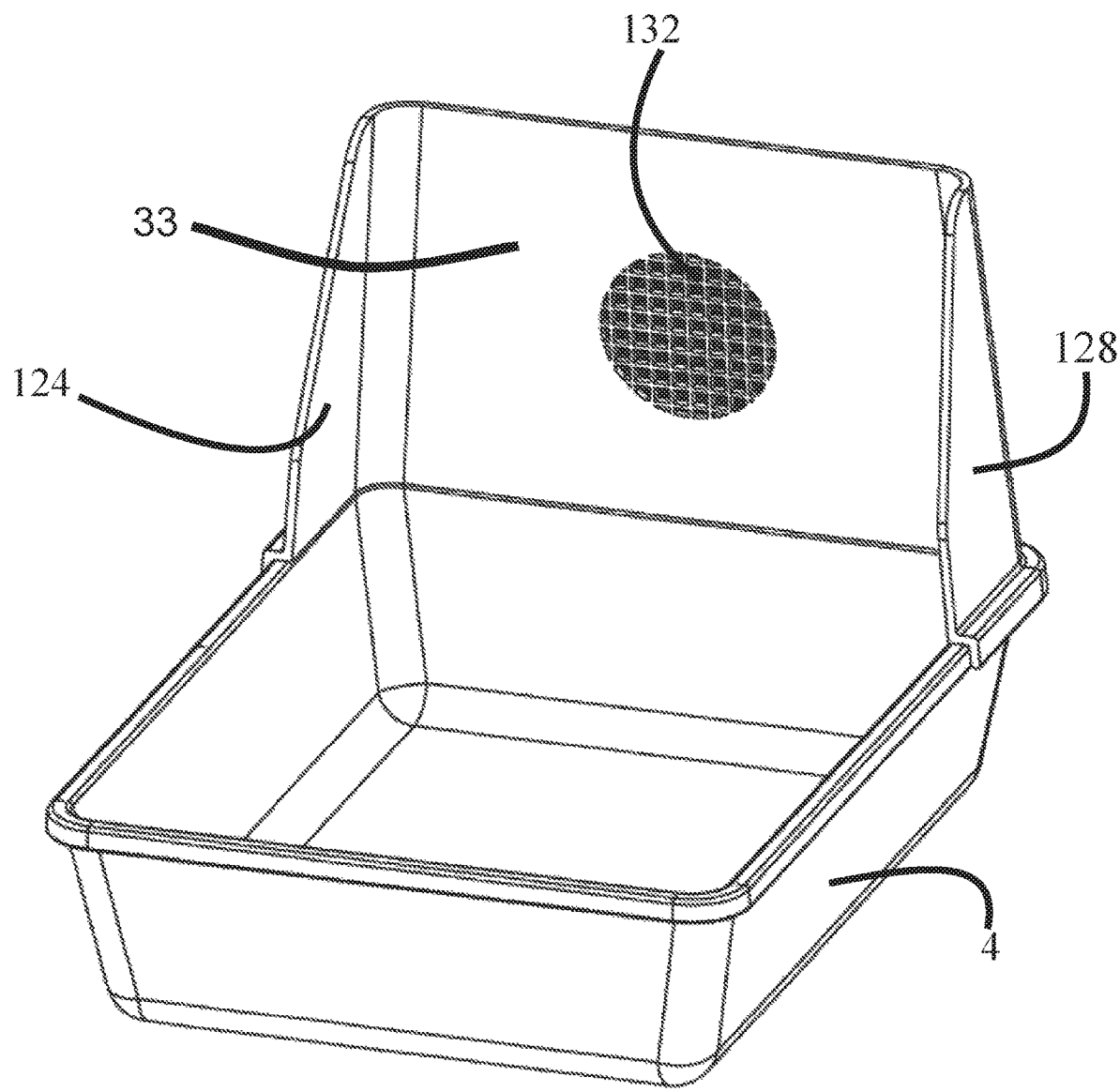
FIG. 6 is a front perspective view of the odor filter apparatus from FIG. 5.

FIG. 6 shows a front perspective view of the invention 120 from FIG. 5. In this view, a vent 132 located in the rear wall 33, and aligned with the filter housing 2 on the other side of the wall 33 is visible. The vent 132 allows the invention 120 to clean the air proximate to the litter in the litter box bottom 4.

Figure 7:
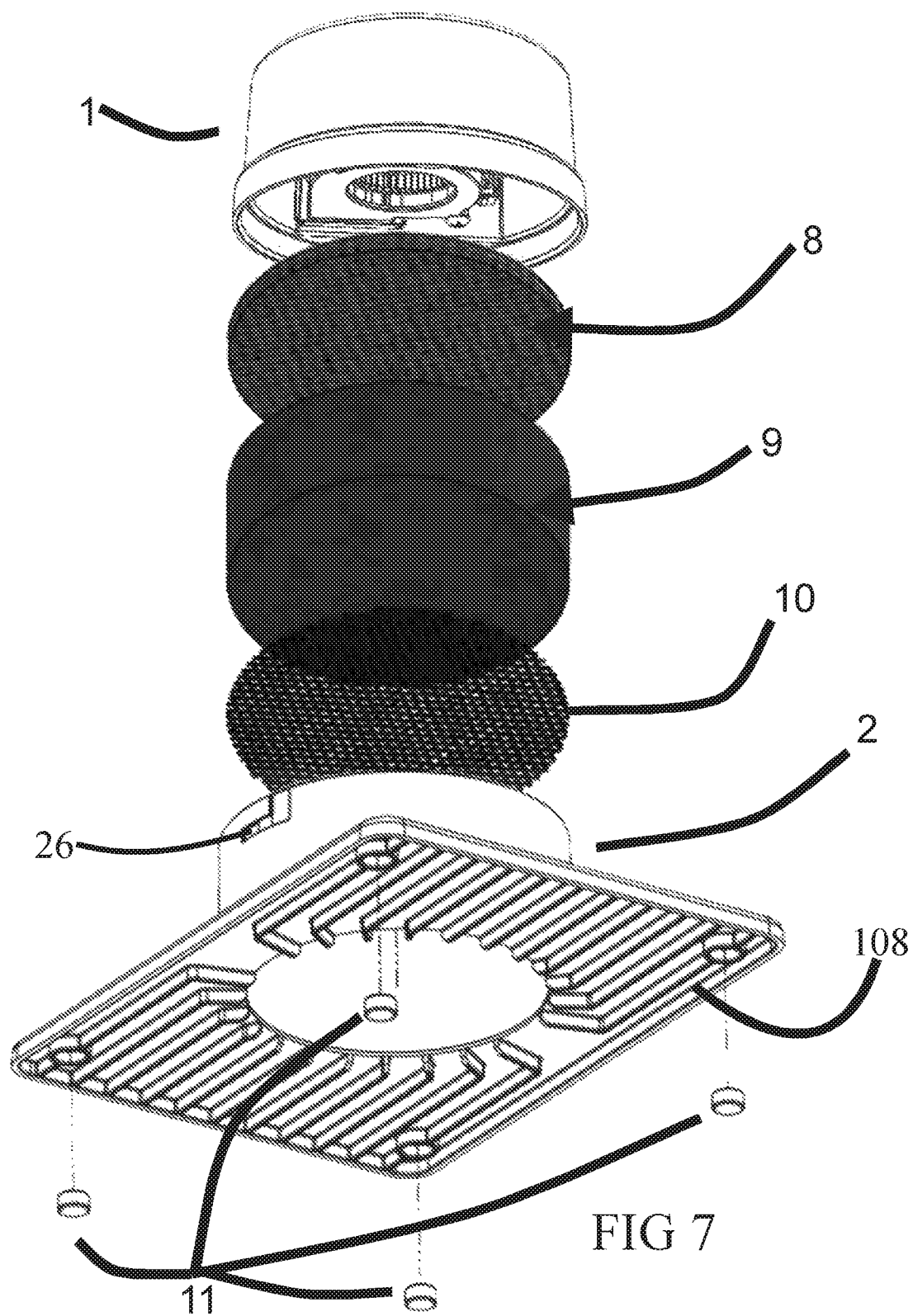
FIG. 7 is an exploded view of the filter housing.

FIG. 7 shows an exploded view of the filter housing 2. A dust filter 8 is shown adjacent to the bottom of the fan assembly housing 1, and to an active odor removing element 9. The odor removing element 9 may include, but is not limited to: activated carbon; zeolite and formats of activated carbon and zeolite such as granular, pelletized and others can be effective when packaged to reside in the filter housing 2. Adjacent to the active odor removing element 9 is a protective screen 10 to protect the active odor removing element, generally to prevent the animal in the litter box from clawing, scratching, getting at the active odor removing element 9. Attachable to the bottom of the vent base 108 may be four soft rubber button feet 11. In one embodiment, the button feet 11 may be self-stick. A twist locking device 26 is located on the filter housing 2. The twist locking device 26 is configured to removeably attach and lock together the filter housing 2 to the fan assembly housing 1 with a twist locking device 27 (not shown in this view) located on the fan assembly housing 1.

Figure 8:
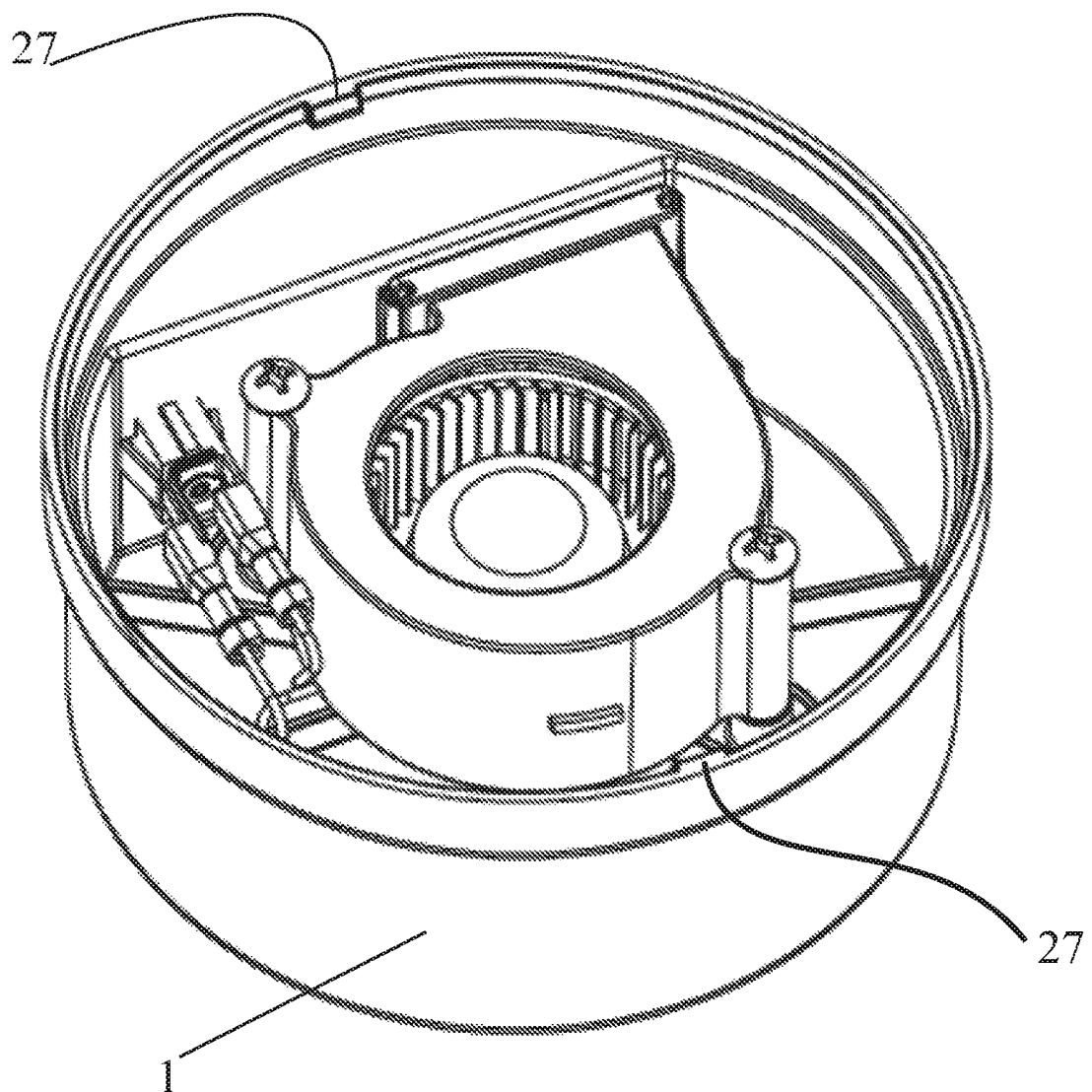
FIG. 8 is bottom view of the fan assembly housing.

FIG. 8 shows a bottom view of the fan assembly housing 1. In this view, the two twist locking devices 27 re visible.

Figure 9:
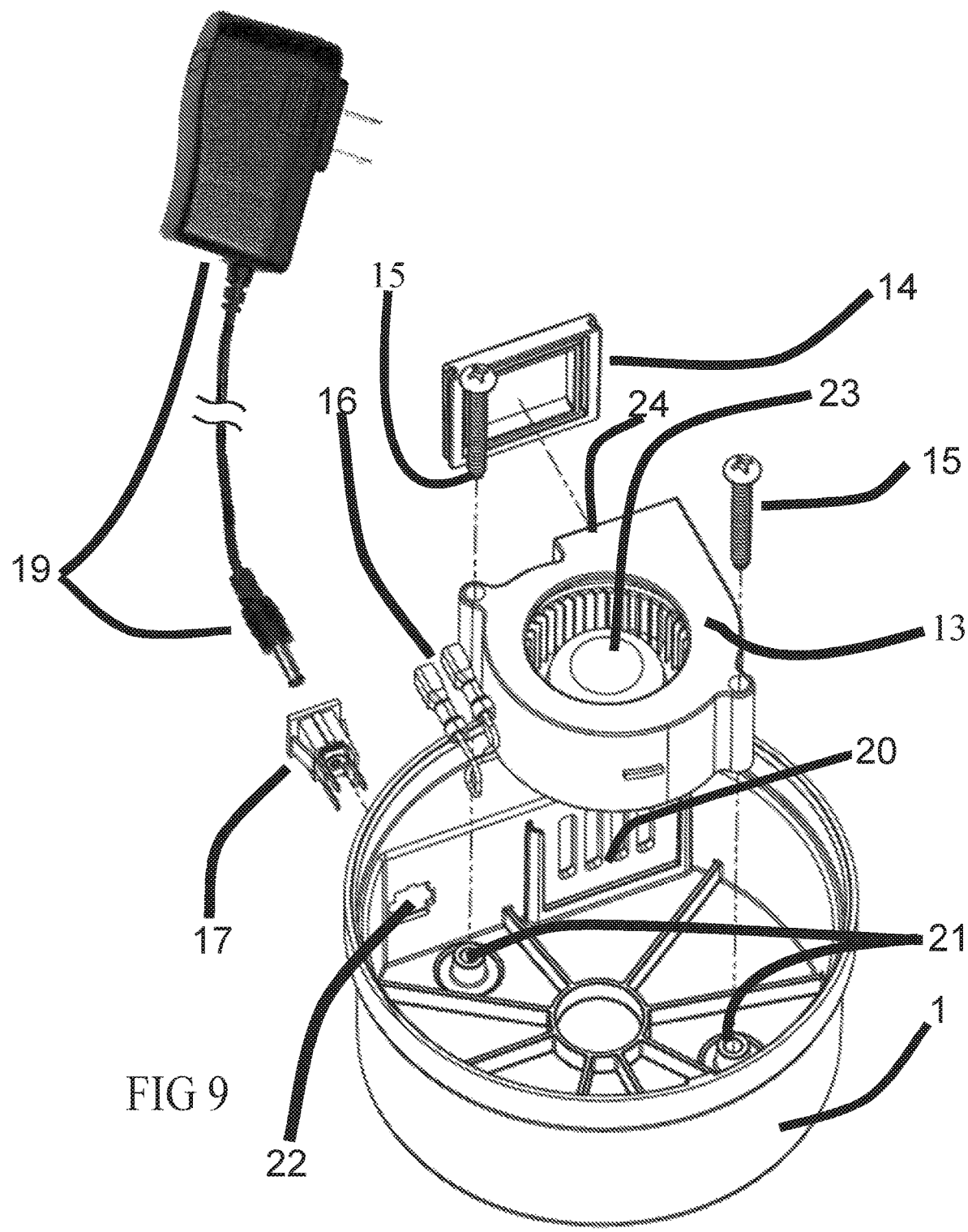
FIG. 9 is an exploded view of the fan assembly housing from FIG. 8.

FIG. 9 is an exploded view of the fan assembly housing from FIG. 8, including an AC plug in power supply with cord 19. A blower fan 13 is shown, a fan exhaust sealing device 14 is shown, and when assembled is in fluid communication with the blower fan 13. Blower mounting screws 15 are shown. The power connectors 16 for blower fan 13 are shown. An electrical power supply adaptor 17 is shown. An AC plug in power supply with cord 19 is shown with a DC plug. An exhaust mounting 20 is shown; the exhaust mounting 20 is configured to house the fan exhaust sealing device 14. Two molded blower-mounting bosses 21 are shown in the top of the fan assembly housing 1. Also located in the fan assembly housing 1 is an electrical power supply adaptor mounting hole 22. The blower fan 13 comprises a fan wheel 23, and an exhaust outlet 24. In another embodiment, the blower lead wires may also be directly wired (soldered) to the power connector.

Figure 10:
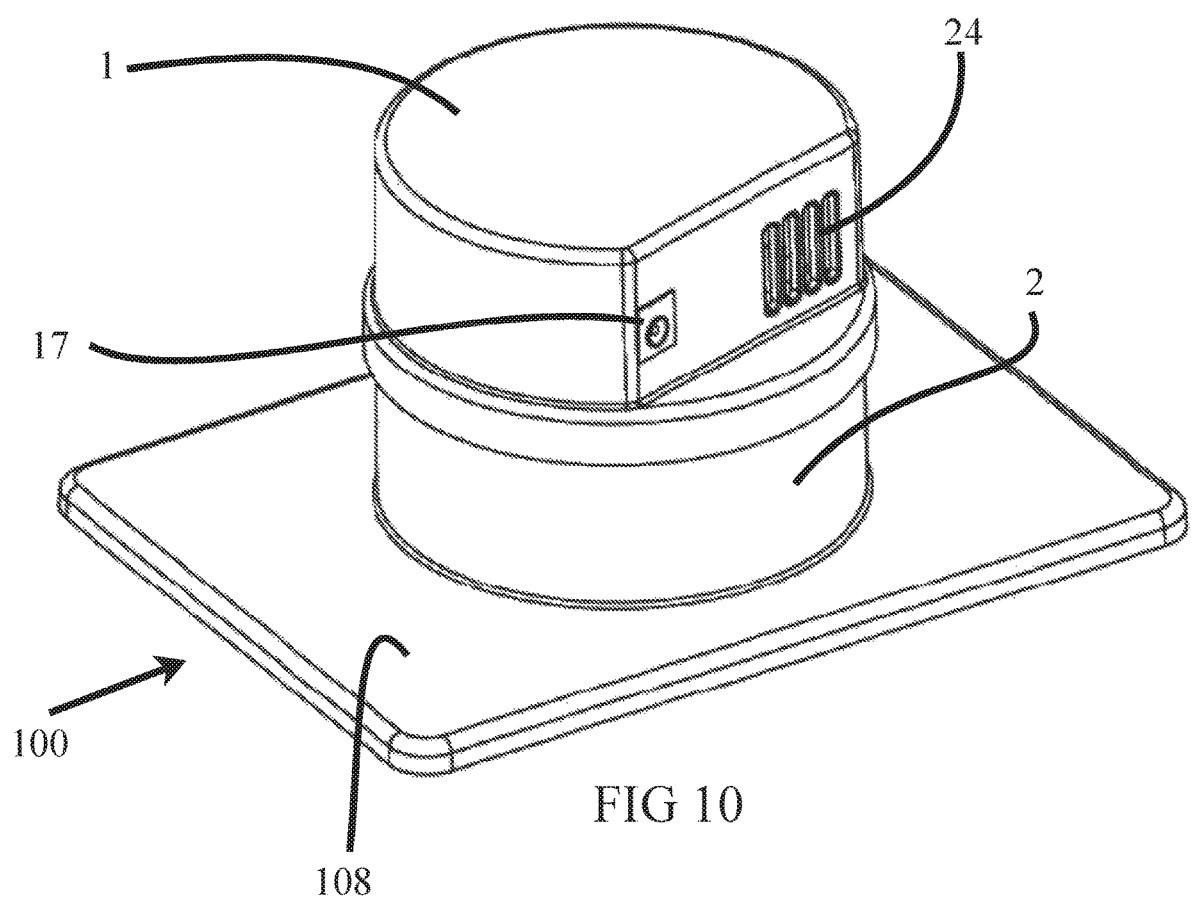
FIG. 10 is a view of the odor filter apparatus in the unlocked configuration.

FIG. 10 is a perspective view of the odor filter apparatus 100. In one embodiment, if the fan assembly housing 1 is rotated clockwise with respect to the filter housing 2, the fan assembly housing 1 and filter housing 2 will lock together due to the twist locking devices 26, 27 (not visible in this view).

Figure 11:
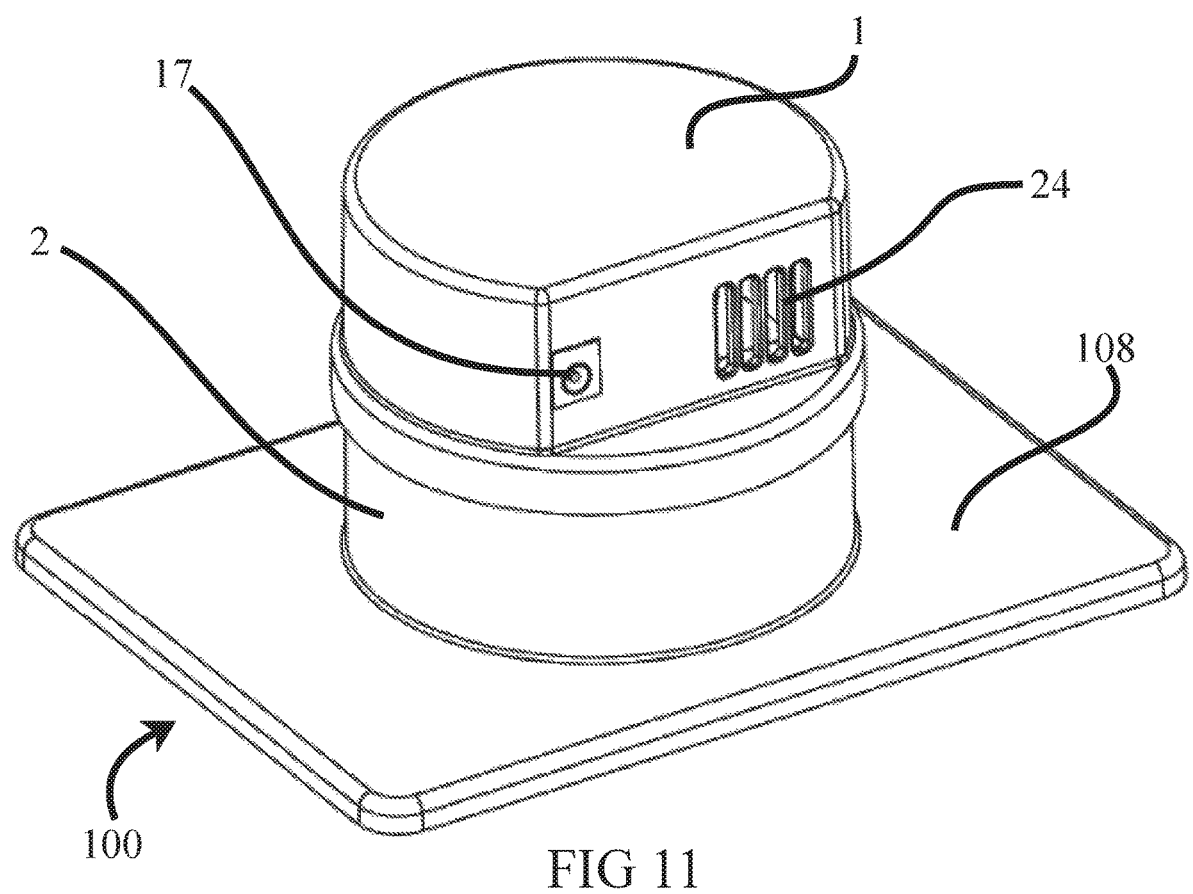
FIG. 11 is a view of the odor filter apparatus from FIG. 10 in a locked configuration.

FIG. 11 is a perspective view of the odor filter apparatus 100, in a locked configuration.

Figure 12:
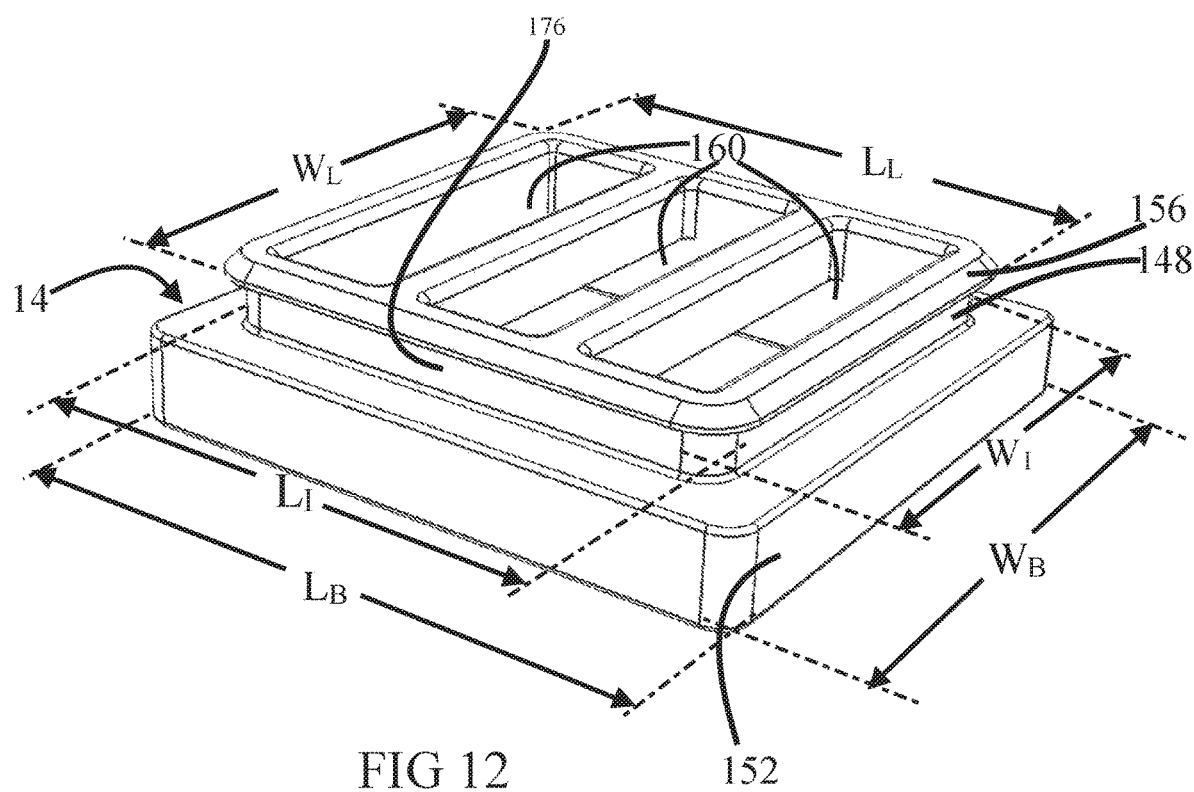
FIG. 12 is a front perspective view of the fan exhaust sealing device.

FIG. 12 is a front perspective view of another embodiment of a fan exhaust sealing device 14. This device 14 is configured to have insertion portion 148, and a base portion 152. The insertion portion 148 extends out from the base portion 152. The insertion portion has a lip 156 that is located on the perimeter of the insertion portion 148. The lip 156 has a length $L_L$ and width $W_L$. $L_L$ will be slightly larger than $L_O$, and $W_L$ will be slightly larger than $W_O$. The non-lip part of the insertion portion also has a length $L_I$ and width $W_I$, however $L_I$ and $W_I$ will be slightly smaller than $L_L$ and width $W_L$ respectively, and be about the same or slightly smaller than $L_O$ and $W_O$, respectively. The portion with the length $L_I$ and width $W_I$ is the groove or recess 176. The base portion 152 also has a length $L_B$ and width $W_B$, however $L_B$ and $W_B$ will be generally larger than $L_O$ and width $W_O$, respectively. The lip 156 being slightly larger than the adaptor mounting opening 144 will make the exhaust sealing device 14 be able to be securely fixed in the mounting opening 144. The fan exhaust sealing device 14 may be made out of a low durometer material so that it can slightly deform in shape to allow the insertion of the device 14 into the mounting opening 144. In one embodiment, a low durometer material of Shore A 30 to 40 hardness will help prevent air leaks and noise from the exhaust blower fan 13. The insertion portion 148 may have three vertical openings 160.

Figure 13:
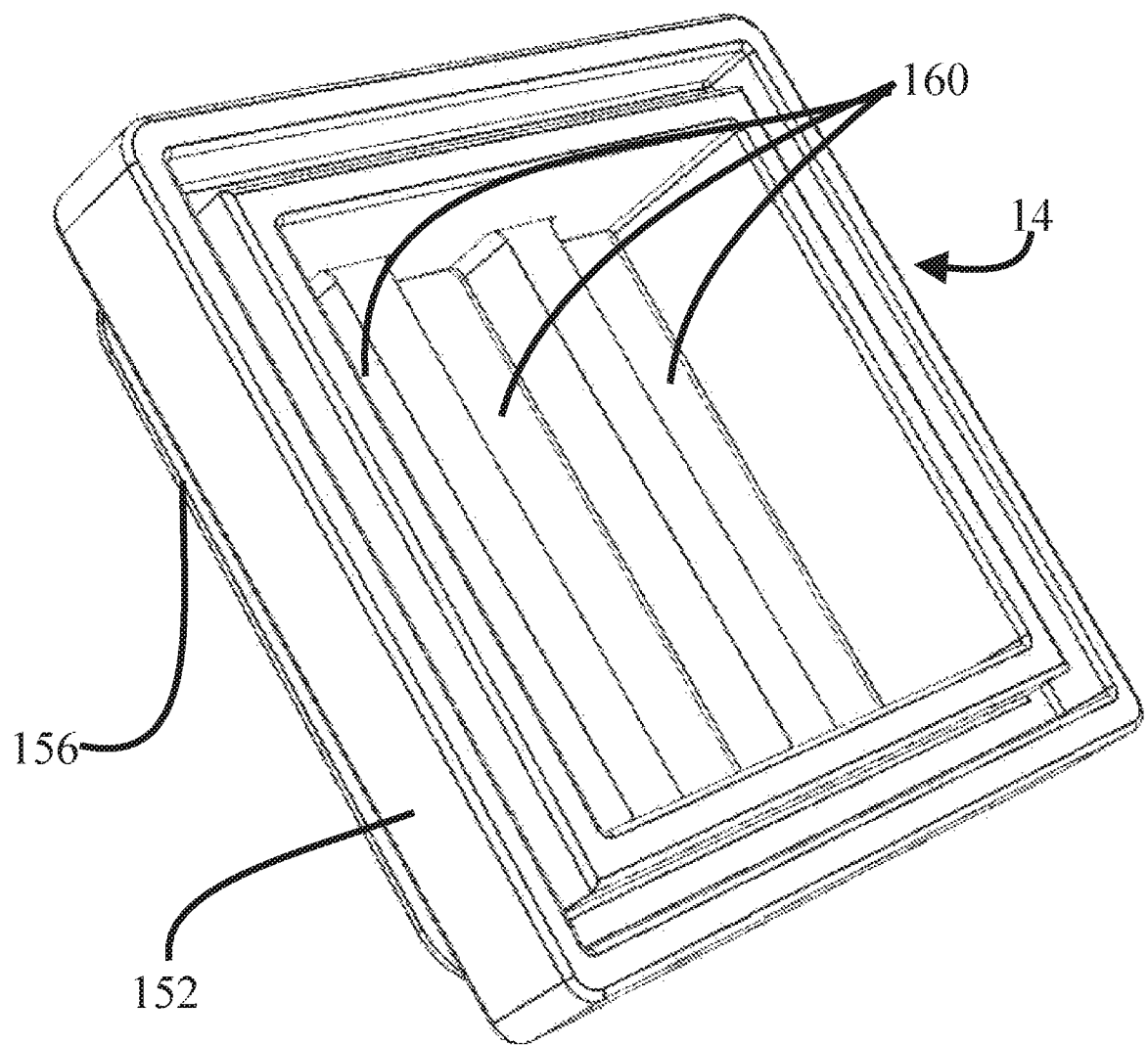
FIG. 13 is a rear perspective view of the fan exhaust sealing device from FIG. 12.

FIG. 13 is a rear perspective view of the fan exhaust sealing device 14 from FIG. 12.

Figure 14:
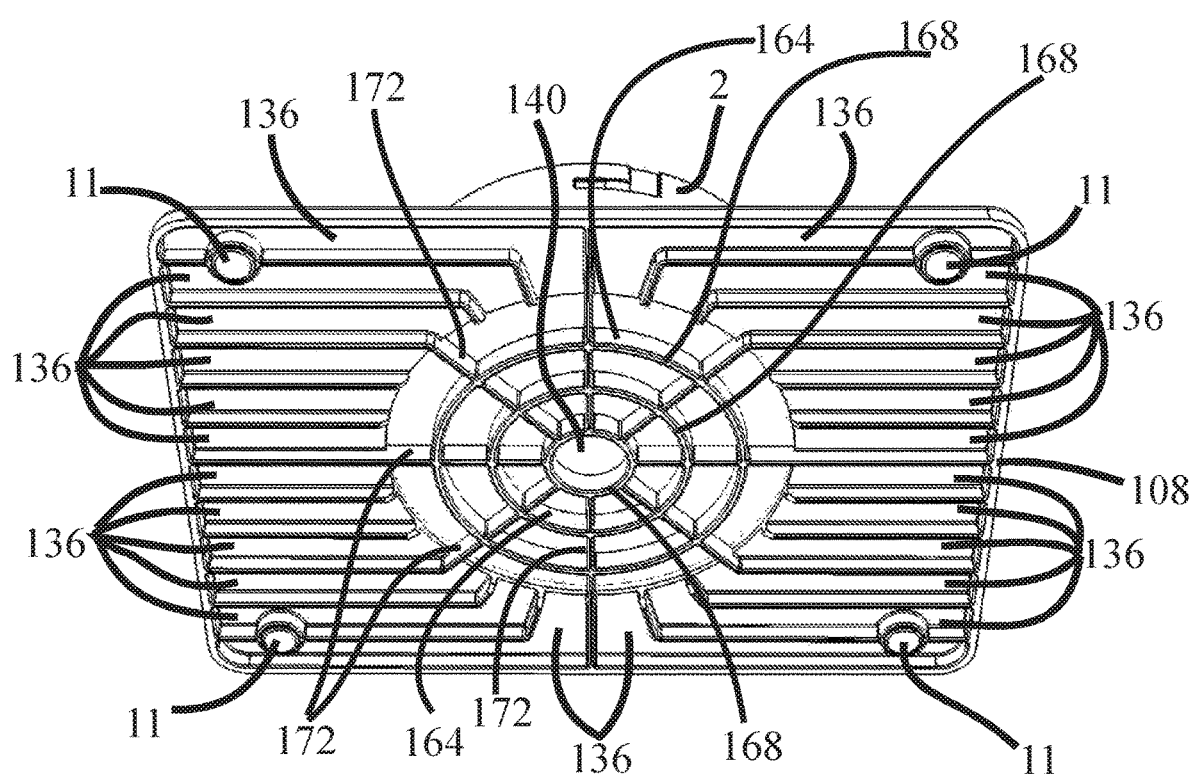
FIG. 14 is a bottom perspective view of the vent base.

FIG. 14 is a bottom perspective view of the vent base 108. In this view, the four soft button feet 11 are visible. The soft button feet may be made out of a soft, rubbery, self stick backed material, so that when the odor filter apparatus 100 is operating, any vibration noise will be muted by the soft button feet 11, which generally will be abutting the top of a litter box top 3. Further, the bottom of the vent base 108 will have channels 136 that help direct air flow into the inlet 140 of the vent base 108 and then on through the filter housing 2, and then eventually to the inlet of the blower fan 13. The channels 136 may run generally parallel to the length of the vent base 108, and if necessary, may angle slightly to direct air flow into the inlet 140. In other embodiments, the channels 136 may emanate radially from the inlet. The channels increase the collection surface area of the device thus allowing for a more efficient and complete gathering of the odoriferous air from the litter box. Another improvement shown in FIG. 14, is the inclusion of a "spider web" shaped channel walls 164. The spider web shaped channel walls 164 comprise a plurality of concentric circular walls 168 and a plurality of radial walls 172. This spider web shape design allows for a large amount of air flow into the protective screen, active odor removing element 9, and dust filter 8. In other embodiments, when using the spider web shaped channel walls, the protective screen may be omitted. The spider web shaped channel walls also makes filter replacement more foolproof because in the earlier versions it was possible to wrongly insert the protective screen. The spider web shaped channel walls 164 provide less access for the cat, to pull on the screen or active odor removing element with its claws.

Figure 15:
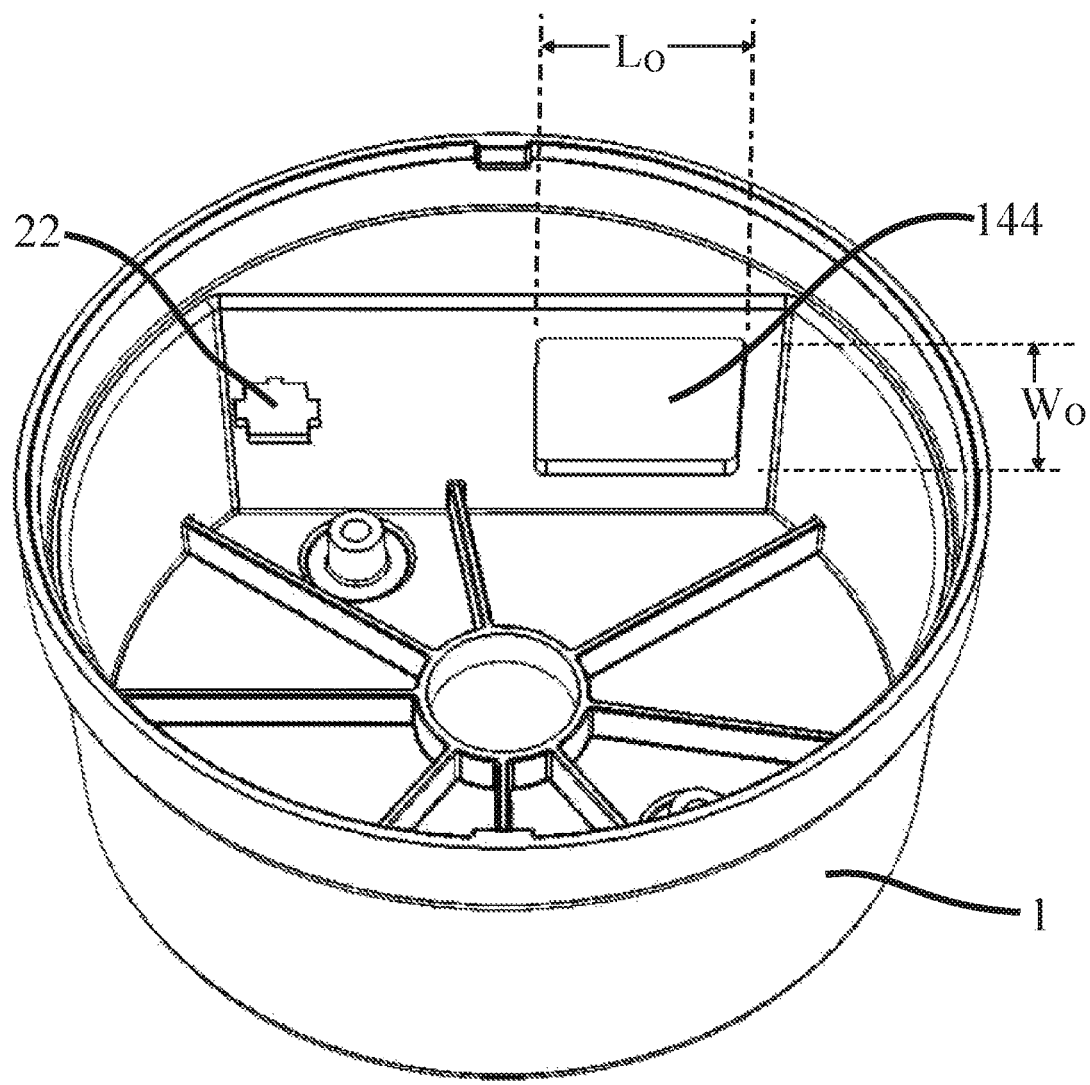
FIG. 15 is a bottom perspective view of the fan assembly housing.

FIG. 15 is a bottom perspective view of another embodiment of the fan assembling housing 1. In this view the electrical power supply adaptor mounting hole 22 is visible, as is a mounting opening 144 for a fan exhaust sealing device 14. The mounting opening 144 has a length $L_O$, and a width $W_O$.

Figure 16:
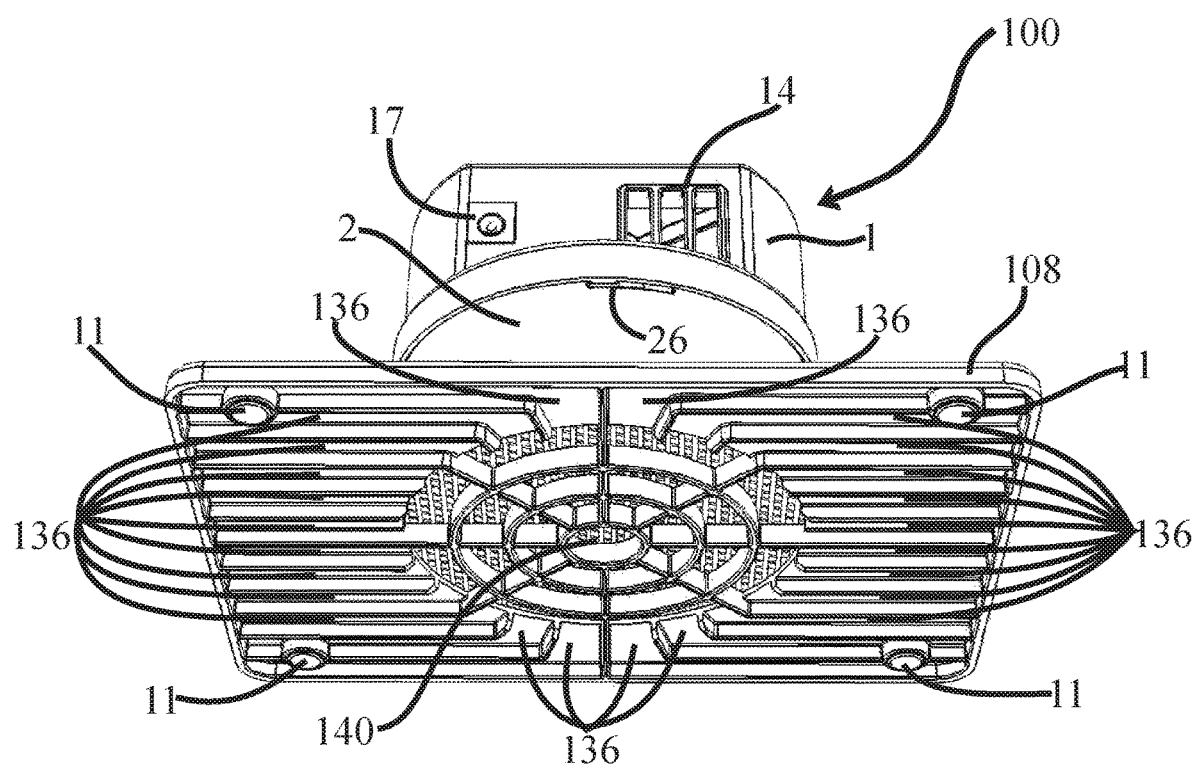
FIG. 16 is a front perspective view of the odor filter apparatus.

FIG. 16 is a bottom perspective view of the odor filter apparatus 100.

The disclosed invention has many advantages. The odor filter apparatus will run relatively quietly due to a careful design including the soft button feet and the fan exhaust sealing device, thereby acoustically blending into the background sounds so as to be ignored by both humans and animals. The odor filter apparatus can be easily set on top of a litter box top. The fan assembly housing can be removed from the filter housing, thereby providing easy access to the interior of the filter housing for replacement of filters, screens, and odor removing elements, and to access the blower fan in case of service, or to simply replace the entire fan assembly and housing. In one embodiment, the odor filter apparatus will draw air from the interior of the litter box through a top vent and clean that air with the active odor removing element before directing the clean air back into the same room. In another embodiment, the odor filter apparatus may be integral to a litter box top. In another embodiment, the odor filter apparatus may be configured to attach to a rear wall which is attachable to a litter box bottom.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. An odor filter apparatus for a litter box, the odor filter apparatus comprising:
    a rear wall, the rear wall configured to rigidly attach to at least one wall of a litter box, wherein the litter box consists of a bottom surface, and at least one wall extending up from the bottom surface, and where the interior of the at least one wall and the interior of the bottom surface are configured to hold and abut against an amount of cat litter suitable for a cat to use for expressing urine and feces;
    a first side wall located on one side of the rear wall, and orientated orthogonally to the rear wall, the first side wall configured to rigidly attach to the at least one wall of the litter box;
    a second side wall located on an opposite side of the rear wall from the first side wall, and orientated orthogonally to the rear wall the first side wall configured to rigidly attach to the at least one wall of the litter box;
    a vent located in the rear wall, the vent having an outer perimeter;
    a filter housing attached to the rear wall, on a side opposite the first and second side walls, the filter housing having an outer perimeter;
    an active odor removing element located in the filter housing;
    a fan assembly housing removeably attached to the filter housing, the fan assembly housing having an outer perimeter;
    a blower fan located in the fan assembly housing;
    a mounting opening in the fan assembly housing;
    a fan exhaust sealing device attached to the mounting opening, the fan exhaust sealing device comprising:
        a base portion;
        an insertion portion extending out from the base portion;
        a lip located on the perimeter of the insertion portion; and wherein the insertion portion and lip extend through the mounting opening, and the base portion remains in the fan assembly housing;
        wherein the mounting opening has a length LO, and a width WO, the lip has a length LL and width WL, the non-lip part of the insertion portion has a length LI and width WI, the base portion has a length LB and width WB, and wherein LL and WL will be slightly larger than LO and WO, respectively; LI and WI will be slightly smaller than LL and WL, respectively, and LI and WI will be about the same or slightly smaller than LO and WO, and LB and WB will be generally larger than LO and WO, respectively; and
    wherein the blower fan is configured to pull air through the vent, through the active odor removing element, and out through the fan exhaust sealing device; and
    wherein the outer perimeter of the vent is generally the same size and shape as the outer perimeter of the filter housing and the fan assembly housing.

2. The odor filter apparatus of claim 1, further comprising:
    a dust filter located in the filter housing and adjacent to the active odor removing element;
    a protective screen located in the filter housing and adjacent to the active odor removing element and on a side of the active odor removing element opposite the dust filter, the protective screen orientated to be between an animal in the litter box and the active odor removing element when in use.

3. The odor filter apparatus of claim 1, wherein the non-lip part of the insertion portion with the length LI and width WI is a recess.

4. The odor filter apparatus of claim 1, wherein the fan exhaust sealing device is made out of a low Durometer material with Shore A hardness of about 30 to about 40.

5. The odor filter apparatus of claim 1, wherein the fan exhaust sealing device is made out of Neoprene or Silicone Rubber.

\* \* \* \* \*